(12) United States Patent
Froehlich et al.

(10) Patent No.: US 10,246,202 B2
(45) Date of Patent: Apr. 2, 2019

(54) CONTAINER-TREATMENT MACHINE

(71) Applicant: KHS GmbH, Dortmund (DE)

(72) Inventors: Heinrich-Dieter Froehlich, Bad Kreuznach (DE); Thomas Matheyka, Eppstein (DE)

(73) Assignee: KHS GmbH, Dortmund (DE)

( * ) Notice: Subject to any disclaimer, the term of this patent is extended or adjusted under 35 U.S.C. 154(b) by 133 days.

(21) Appl. No.: 15/203,071

(22) Filed: Jul. 6, 2016

(65) Prior Publication Data

US 2018/0009553 A1    Jan. 11, 2018

(51) Int. Cl.
  *B65B 3/04*  (2006.01)
  *B08B 9/08*  (2006.01)
  *B67C 3/00*  (2006.01)

(52) U.S. Cl.
  CPC .............. *B65B 3/04* (2013.01); *B08B 9/0826* (2013.01); *B67C 3/00* (2013.01)

(58) Field of Classification Search
  CPC ........................................................ B65B 3/04
  See application file for complete search history.

(56) References Cited

U.S. PATENT DOCUMENTS 6,267,124 B1 *   7/2001   Bowden .................. B08B 3/041
                                                            134/111

FOREIGN PATENT DOCUMENTS

EP          1 762 540          3/2007

* cited by examiner

*Primary Examiner* — Jason Y Ko
(74) *Attorney, Agent, or Firm* — Occhiuti & Rohlicek LLP

(57) ABSTRACT

A method for treating kegs in a container-treatment machine includes passing a first keg through a first set of treatment stations on the container-treatment machine and passing a second keg through a second set of treatment stations on the container-treatment machine. The first and second sets depend on a condition of the first and second kegs.

30 Claims, 6 Drawing Sheets

CONTAINER-TREATMENT MACHINE

FIELD OF INVENTION

The invention relates to container treatment, and in particular, to treatment of large containers.

BACKGROUND

A typical container-treatment machine receives containers and subjects them all to the same processing steps. Such a container-treatment machine typically receives containers on a conveyor and then passes them to some pre-defined set of treatment sections.

This procedure presupposes that all the containers will require more or less the same treatment. However, this may not always be the case. There may be cases when some containers need different treatment from other containers. For example, heavily-soiled containers may require greater treatment than lightly-soiled containers.

SUMMARY

The present invention relates to a container-treatment machine comprising at least two treatment stations for containers. Examples of treatment stations include a filling station having a cleaning station. The containers can be large cans, small casks, or kegs. Kegs typically valve closures, or fittings.

Such a container-treatment machine includes a first transport device for the containers. The first transport device has either a container infeed or is connected to an external container infeed such as a conveyor belt or a container gripper or robot station. In either case, the first transport device feeds containers to the container-treatment machine.

The container-treatment machine also has a second transport device for the containers that is disposed parallel to the first transport device and that either forms a container discharge or is connected to a discharge for the containers so that the containers are discharged from the container-treatment machine via the second transport device directly or indirectly.

Treatment stations for the containers are arranged between the first and the second transport devices. Intermediate conveyors are associated with at least some of the treatment stations to feed containers to the associated treatment stations. These intermediate conveyors extend between the transport devices. The transport devices do not need to run exactly parallel with one another. Deviations on the order of ±20 degrees are possible.

It is an object of the invention therefore to create a container-treatment machine that is individually configurable and enables containers to be handled effectively and flexibly.

The intermediate conveyors move in contrary conveying directions. This means that one intermediate conveyor conveys from the first to the second transport device and a further intermediate conveyor conveys from the second transport device to the first transport device. In this way it is possible for a container on its path from the first transport device to the second transport device to pass through a treatment station more than once. Additionally, because of the contrary conveying direction of two intermediate conveyors, the container can move over a serpentine transport path between the two transport devices and correspondingly visit multiple treatment stations.

Because of this flexibility, it is possible to guide a heavily-contaminated container through a pre-cleaning station, through a main cleaning station and then, if it is still not completely clean, through a main cleaning station again before sending it to the filling station. This is possible, for example, if the main cleaning stations are arranged in sequence between the two transport devices and at least two of the associated intermediate conveyors move in a contrary conveying direction. In this way, treatment stations requiring a long or longer treatment and/or residence time can also be provided in multiples or more frequently within the machine than treatment stations that require only a very short or shorter treatment time.

Through an individual selection of the transport path therefore, the containers can undergo different treatments allowing them to be treated more or less individually depending on their required treatment and/or residence time or their degree of contamination. This allows the treatment, and in particular the cleaning and filling, of containers that initially have very different levels of contamination.

The transport path of a container preferably includes at least two sections of the first transport device, at least one intermediate conveyor and at least one, and preferably two sections of the second transport device. The container therefore traverses a serpentine path that meanders between the two transport devices. As already suggested above, an individual treatment of each single container, including as a function of the particular treatment step, can be effected as a result of this guiding of the containers in the container-treatment machine.

In some embodiments, at least one treatment station is a cleaning station and at least one treatment station is a filling station. In this case the container-treatment machine allows the containers to be cleaned as well as filled with a desired product.

If a plurality of cleaning stations are arranged in the container-treatment machine, then an individual cleaning of the different containers is possible because each container can run either only through one cleaning station or a plurality of cleaning stations in succession depending on its degree of contamination. Also, as previously indicated, a longer cleaning and residence time can also be simply provided in the plurality of cleaning stations without having to limit the capacity in the concluding rapid filling step.

In some embodiments, at least one treatment station is a pre-cleaning station and at least one treatment station is a main cleaning station. This facilitates the ability to clean more heavily contaminated containers so as to make them suitable for re-filling with a product.

In yet other embodiments, at least one treatment station is an external cleaning station that ensures that the containers are also cleaned on the outside. This promotes having containers with an appealing outward appearance.

In some embodiments, at least one treatment station is a buffer station that holds a container so that it does not proceed downstream. This suppresses the possibility of treatment backlogs that arise from differences between treatment speeds of the cleaning stations and filling stations. Having buffer stations means that such differences will not require stopping or interrupting the operating sequence of the container-treatment machine. Having a buffer station also provides an extra degree of freedom to achieve optimum occupancy of the first and second transport devices and hence improved overall performance.

In some embodiments, one of the treatment station is a sterilization station. This ensures that a container is aseptic before it is filled. A sterilization station typically carries out its function using hot water-vapor, or other sterilizing fluids. In this case the sterilization station is disposed preferably between the cleaning stations, and in particular, between the main cleaning station and the filling station.

In an advantageous embodiment of the invention, at least one treatment station is configured as an inspection and test station and is therefore capable of checking the functionality of the valve, incidences of damage, as well as the weight and/or degree of contamination of a container. An inspection and test station of this kind can therefore be used to control the transport path of the container if it is arranged at the beginning of the container-treatment machine, for example. An inspection and test station of this kind can also be provided at the beginning and end of the cleaning stations so as to determine at the start how many cleaning stations the container has to negotiate and to verify at the end whether the container possesses the necessary cleanness after it has passed through the cleaning station or cleaning stations. This is an advantage if the inspection and test station controls the feeding of the containers to at least some of the treatment stations.

In some embodiments, the container-treatment machine comprises at least one third transport device that is arranged parallel to and adjacent to the first or second transport device. This third transport device conveys in a direction contrary to whichever of the first and second transport devices it is adjacent to.

This third transport device connects to an intermediate conveyor and/or to a separate transfer conveyor. The third transport device returns containers by conveying them in a direction contrary to the transport direction of the first two transport devices. This brings the containers back to an earlier treatment phase, and in some cases, all the way back to the beginning of a sequence of cleaning stations.

While the first and second transport devices convey in the same direction, only a limited number of cleaning stations can be arranged between them. This tends to limit individual treatment of the containers. For example, given a heavily contaminated container, the transport path can only be extended to the extent that this container passes through each of the cleaning stations that have sequentially different conveying directions of their associated intermediate conveyor. If the container were then still dirty after having passed through the last cleaning station, there would be no choice but to eject or dispose of that container.

The third transport device makes it possible to give that container a second chance at being cleaned. The third transport device brings such a container back to the start of the entire processing of the treatment machine where it is fed again to a pre-cleaning station and to the sequence of cleaning stations so that it can be cleaned all over again.

The third transport device, when combined with the serpentine transport path, further extends the transport path can be achieved because a container then has the opportunity to make another pass through the serpentine transport path. The third transport device therefore vastly increases the number of individual treatment options for the containers.

The third transport device is preferably connected to or controlled by the inspection and test station so that it can be appropriately activated based on the state of an inspected container.

In some embodiments, the third transport device connects to a container disposal or discharge station that enables the container-treatment machine to dispose of, or to exclude from the filling process, heavily contaminated containers that do not become clean even after having been repeatedly returned and passed through the cleaning station. This prevents such containers from holding up the overall filling process.

Some embodiments feature switchable deflection elements arranged in the connection region between the transport devices and the intermediate conveyors. Examples of such deflection elements include gates, baffle plates, guides, any intrinsically known deflecting or guiding apparatus of such a nature. These deflection elements permit containers at each treatment station to be transferred between an associated intermediate conveyor and a transport device. In particular embodiments, the deflection elements are mounted on the intermediate conveyor so that the container-treatment machine always has the same number of deflection elements as it does intermediate conveyors and associated treatment stations.

In an advantageous embodiment of the invention the conveying direction of the intermediate conveyors is reversible. The individual treatment of the containers can once again be improved in this way. It is also possible for example for an inspection and test station to collect a container from the first transport device by way of the associated intermediate conveyor in that first transport device, to test it and then subject to a positive test result return it to the first transport device; this would require a reversal of the conveying direction. Other possible applications of this reversal of the conveying direction of the intermediate conveyors are also conceivable of course.

The transport devices are constituted, in particular, by endless conveyors such as for example conveyor belts, elliptically displaceable lifting beams, or electrically traversing lifting beams or intrinsically known transport devices in the drinks handling and filling technologies.

Stop or guide elements are preferably configured in conjunction with the intermediate conveyors in order to guide or lead the containers on the intermediate conveyors and on their path from a transport device to the intermediate conveyor or from the intermediate conveyor to a transport device.

In an advantageous embodiment of the invention, at least one transfer conveyor with no associated treatment station is provided between the transport devices in order to transfer the containers from one transport device to the other.

This increases the degree of freedom in the guiding of the containers in the container-treatment machine. Such a transfer conveyor can for example be arranged between two cleaning stations which have the same conveying direction. In this case, once the container has negotiated the first cleaning station, the transfer conveyor is used to transfer it back to the first transport device where it can pass through the second cleaning station once more. In this way the transfer conveyor can also be used to select the serpentine transport path when the intermediate conveyors associated with the treatment stations have an identical conveying direction. The transfer conveyor is therefore a special kind of intermediate conveyor with no associated treatment station.

In some embodiments, the container-treatment machine comprises a frame that holds treatment stations. This permits adapting the container-treatment machine to suit different treatment processes. For example, the frame can comprise a particular length, to accommodate twelve treatment stations.

The modular arrangement of the treatment stations in the frame makes it possible to assemble the treatment stations in any desired order. For example, it is possible to arrange treatment stations to have two pre-cleaning stations, four main cleaning stations, two inspection and test stations, one transfer conveyor and two filling stations. It is also possible to create other permutations and combinations of treatment stations. This allows the container-treatment machine to be individually configured to suit very different tasks.

The first and second transport devices preferably comprise a matching conveyor device so that, in conjunction with the contrary conveying directions of at least two intermediate conveyors, it becomes possible to construct a variety of different serpentine transport paths. This facilitates individual processing of the individual containers in the different treatment stations can be established in the container-treatment machine.

The invention also relates to a method for treating containers, especially kegs, in a container-treatment machine of the above type. The containers are preferably guided through a plurality of treatment stations along a serpentine transport path between the first and second transport devices.

The number of treatments per container can preferably be detected by at least one inspection and test station.

Preferably the inspection and test station causes the containers to be transferred to a third transport device and in the treatment machine to be conveyed to a previous treatment station. This makes it possible for a container to be able to repeatedly undergo a cleaning cycle through a plurality of cleaning stations in that after passing through the cleaning stations it is returned by the third transport device to upstream of the first cleaning station. Preferably the containers can also be diverted by the third transport device to a container disposal or container discharge station.

The container-treatment machine and all embodiments are suitable for treating and filling conventional kegs or casks that have a valve, for which purpose it is necessary in the associated treatment module to turn the keg or cask upside down and to use a ram to press the keg onto its valve The container transport alone could of course also be effected with the valve or opening on top. But as a rule, the container will not be turned in the container-treatment machine. It will instead be conveyed upside down throughout the procedure.

This pressing station too can be provided either in conjunction with the filling station or separately as a container treatment station or treatment module.

The treatment modules are preferably complete and interchangeable treatment stations that, in principle, are self-contained, at least after having been appropriately connected to fluids, to an energy source, and to controller. Each treatment station is able to operate independently of the others, for example if containers are adjusted manually.

The following terms are used synonymously: treatment station, treatment module, container-treatment station, and container-treatment module. The following terms are also used synonymously: transfer conveyor, and intermediate conveyor. The following terms between sets of semi-colons are also used synonymously: container-treatment machine, and treatment machine; cleaning module, and cleaning station; filling module, and filling station; machine controller, and controller of the container-treatment machine; and transport device, conveyor belt, and endless conveyor It will be apparent to the skilled person that the embodiments of the invention described above can be combined with one another in any desired way. Individual components of the invention can be provided singly or in multiples.

BRIEF DESCRIPTION OF THE DRAWINGS

The invention is described below by way of example with reference to the schematic drawings, in which.

DETAILED DESCRIPTION

Figure 1:
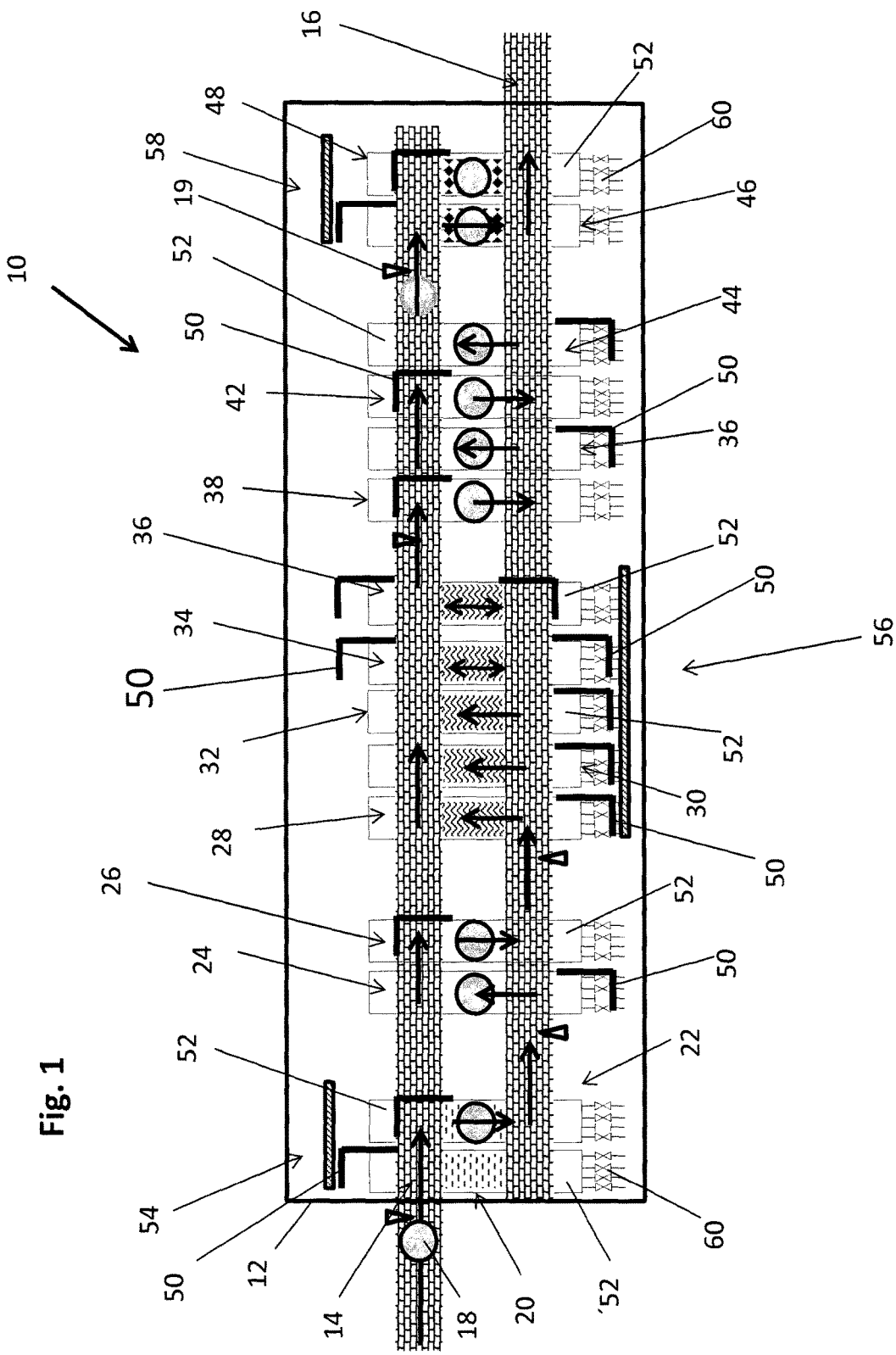
FIG. 1 shows a schematic view of a container-treatment machine that has two transport devices and fifteen treatment stations disposed between them.

A container-treatment machine 10, shown in FIG. 1, comprises a frame 12 in which are arranged a first transport device 14 and a second transport device 16. In the illustrated example, the first and second transport devices 14, 16 are endless conveyor belts that run at least approximately parallel to one another and that preferably move in the same conveying direction. In some embodiments, the transport devices 14, 16 include switchable travel-stops 19. The first transport device 14 feeds containers 18 to the container-treatment machine 10. The second transport device 16 discharges containers 18 from the container-treatment machine 10.

The container-treatment machine 10 accommodates a plurality of treatment modules 20-48 that can be in latched or pushed into the frame 12 between the first and second transport devices 14, 16. Each treatment module 20-48 has its own deflection element 50. The deflection element 50 transfers containers from one of the first and second transport devices 14, 16 to an intermediate conveyor 52 associated with its treatment module 20-48.

The treatment modules 20-48 can also be brought together as a combined module to form treatment groups. For example, FIG. 1 shows a pre-cleaning group 54 that has first and second pre-cleaning modules 20, 22. These are arranged along the conveying direction of the first transport device 14.

Following the pre-cleaning modules 20, 22 are first and second transfer modules 24, 26. These too can be configured as a combined module to form a transfer group. The first and second transfer modules 24, 26 facilitate reciprocal transferring from one transport device 14, 16 to the other transport device 16, 14 in both directions.

In many cases, a treatment module will introduce a fluid, such as hot water, acid, or a base, into a container. This fluid needs to act for a certain period of time. Instead of occupying an outlet valve at the treatment station, this waiting can be carried out downstream of the treatment module. For example, the waiting can occur at the transfer module 24, 26. The transfer module 24, 26 thus acts as a waiting or residence station at which the fluid introduced by an upstream treatment module is given time to act. In some embodiments, the fluid thus introduced can also be drained away from the container at the transfer module 24, 26.

A cleaning group 56 follows the transfer modules 24, 26. The illustrated cleaning group 56 comprises five cleaning modules 28-36. The first three cleaning modules 28, 30, 32 have intermediate conveyors 52 that move in a first conveying direction; and the last two cleaning modules 34, 36 have intermediate conveyors 52 that move either in a second conveying direction that is contrary to the first conveying direction or in that are reversible.

Buffer modules 38-42 and sensor modules 44 that follow the cleaning group 56 buffer containers 18 in case the throughput of containers 18 through the cleaning group 56 does not match the turnover of a filling group 58 formed by the combination of first and second filling modules 46, 48. This makes it possible to equalize differences in the throughputs of the individual groups of the container-treatment machine 10 so that the filling of containers does not cause problems in the processing sequence due to different throughputs of the individual groups.

Each treatment module 20-48 has a fluid interface 60. Pushing a treatment module 20-48 into the frame 12 couples this fluid interface 60 automatically to the container-treatment machine's own fluid interface. This permits connection of the treatment module 20-48 to the container-treatment machine's own fluid feed.

A guide rail or detent device locks those treatment modules that are configured as treatment modules at their respective operating positions in or on the frame 12 of the container-treatment machine 10. As indicated by the arrows on the first and second transport devices 12, 14 and intermediate conveyors 52, as a container 18 moves through container-treatment machine 10 it follows a serpentine path that enables it to be treated individually in different ways.

Figure 2:
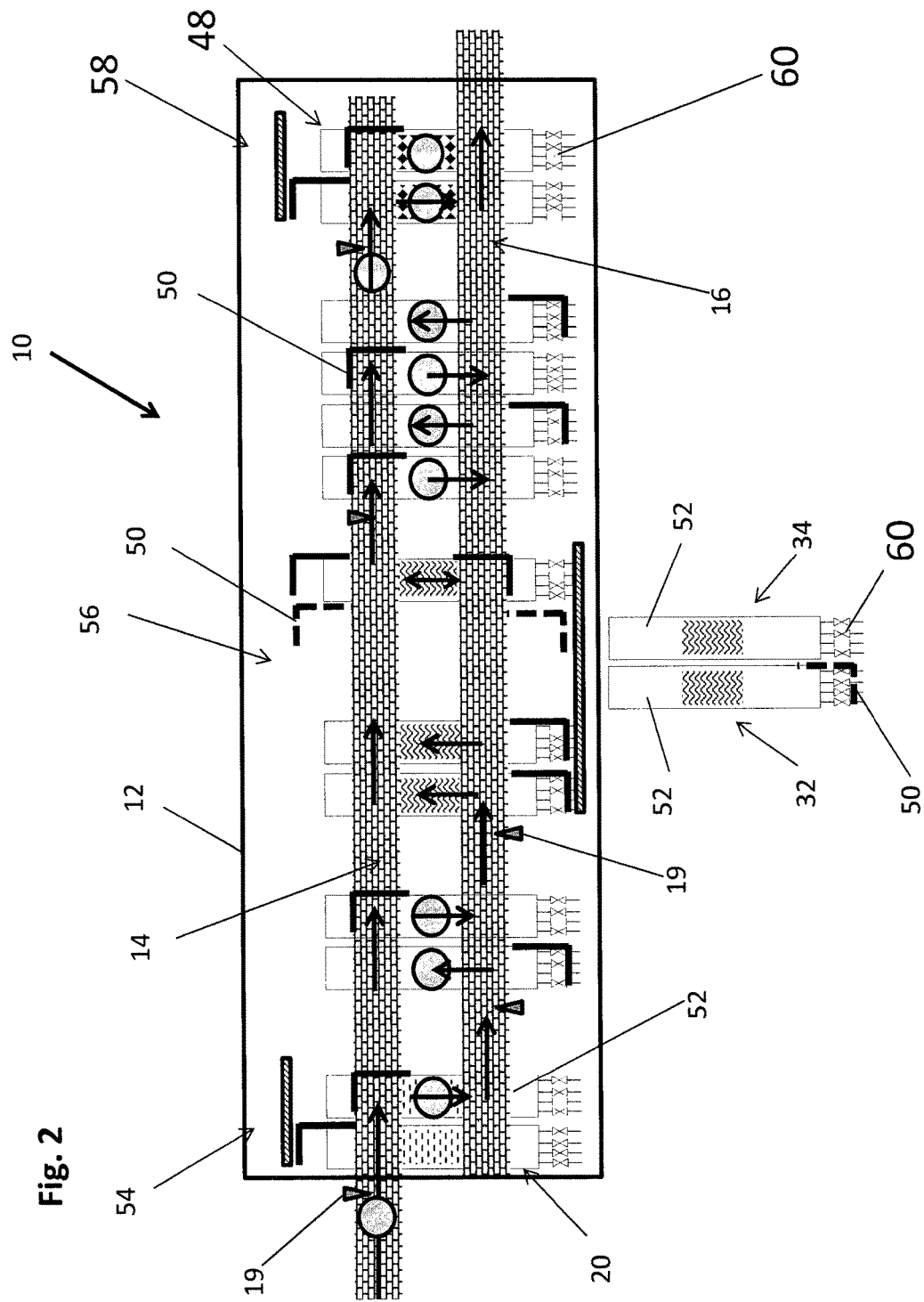
FIG. 2 shows the container-treatment machine of FIG. 1 with two cleaning stations having been removed from the container-treatment machine.

FIG. 2 shows the container-treatment machine 10 of FIG. 1 following removal of two removable cleaning modules 32, 34, together with their associated intermediate conveyors 52. The removability of these and other treatment modules means that modules can easily and quickly be removed and replaced. This modular design thus avoids lengthy downtimes associated with having to shut down the container-treatment machine 10 during repairs.

For this purpose, the stations are first deleted from the treatment layout by a central machine controller of the container-treatment machine and are then deactivated. They can now be easily removed from frame 12 while operations are in progress.

Figure 3:
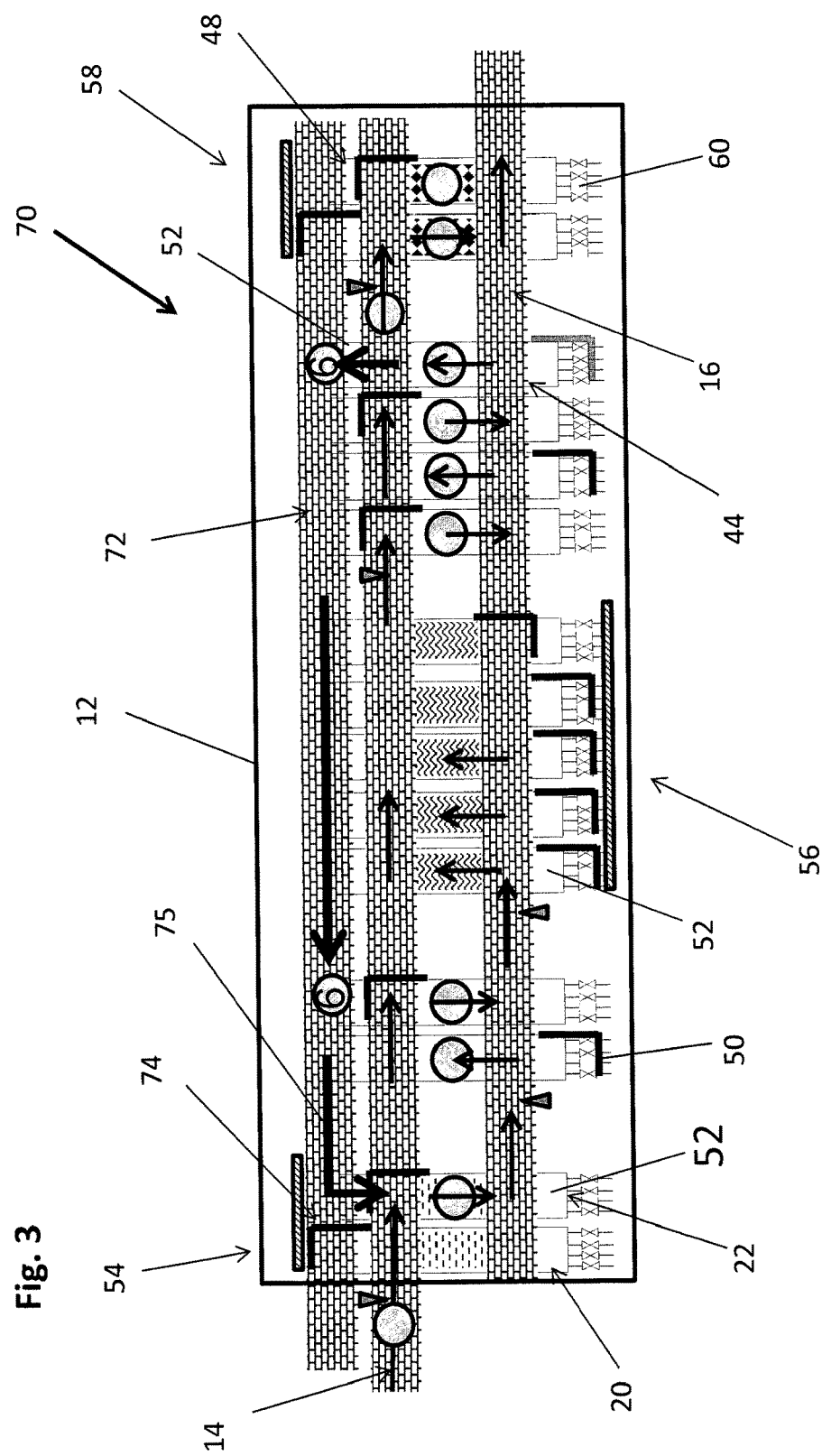
FIG. 3 shows a container-treatment machine similar to that shown in FIG. 1 but having an additionally arranged third transport device.

FIG. 3 shows a container-treatment machine 70 that is configured in a manner similar to that shown in FIGS. 1 and 2. This second embodiment of container-treatment machine 70 includes a third transport device 72 that conveys in a conveying direction that runs contrary to those of the first and second transport devices.

In this case, the sensor and test station 44 of the container-treatment machine 70 is configured so as to transfer unsatisfactorily containers to the third container transport device 72 where they are then fed along a return path 75 back to the pre-cleaning station 22 by way of a deflection apparatus 74 of the third transport device 72. The sensor and test station 44 could, for example, detect residual amounts of cleaning and rinsing fluids or residual contamination. After having been sent back via the return path 75, rejected containers 18 have a second chance to undergo the complete cleaning cycle or parts of the cleaning cycle of the cleaning group 56. The third transport device 72 therefore makes it possible to treat different containers in different ways according to their individual needs.

Figure 4:
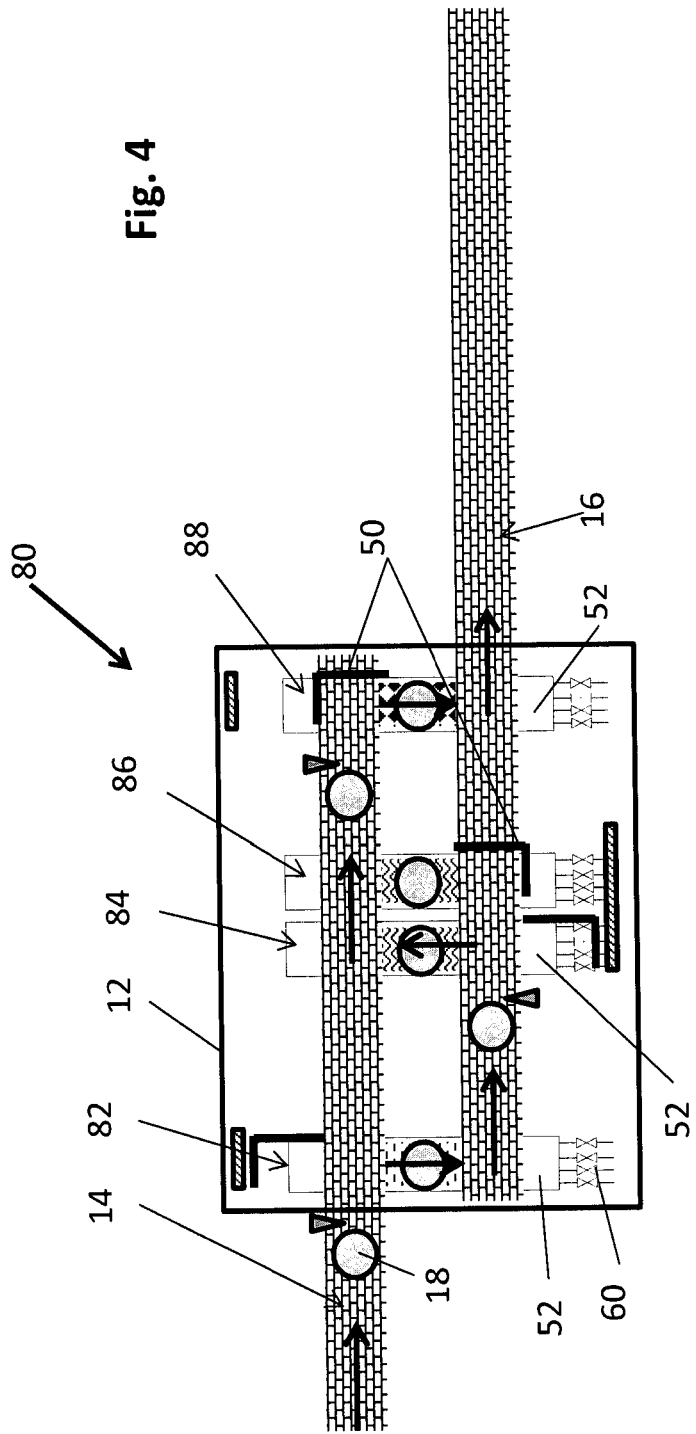
FIG. 4 shows a smaller container-treatment machine for treating returnable kegs.

FIG. 4 shows a third embodiment of a container-treatment machine 80 that is significantly smaller than that shown in FIGS. 1 to 3. The container-treatment machine 80 also has a frame 12 that holds a pre-cleaning module 82, two main cleaning modules 84, 86 and a filling module 88. These components can readily be detached from the frame 12. A relatively small system of this type allows the treatment, i.e. pre-cleaning, cleaning and filling, of returnable kegs as well as other returnable containers.

Figure 5:
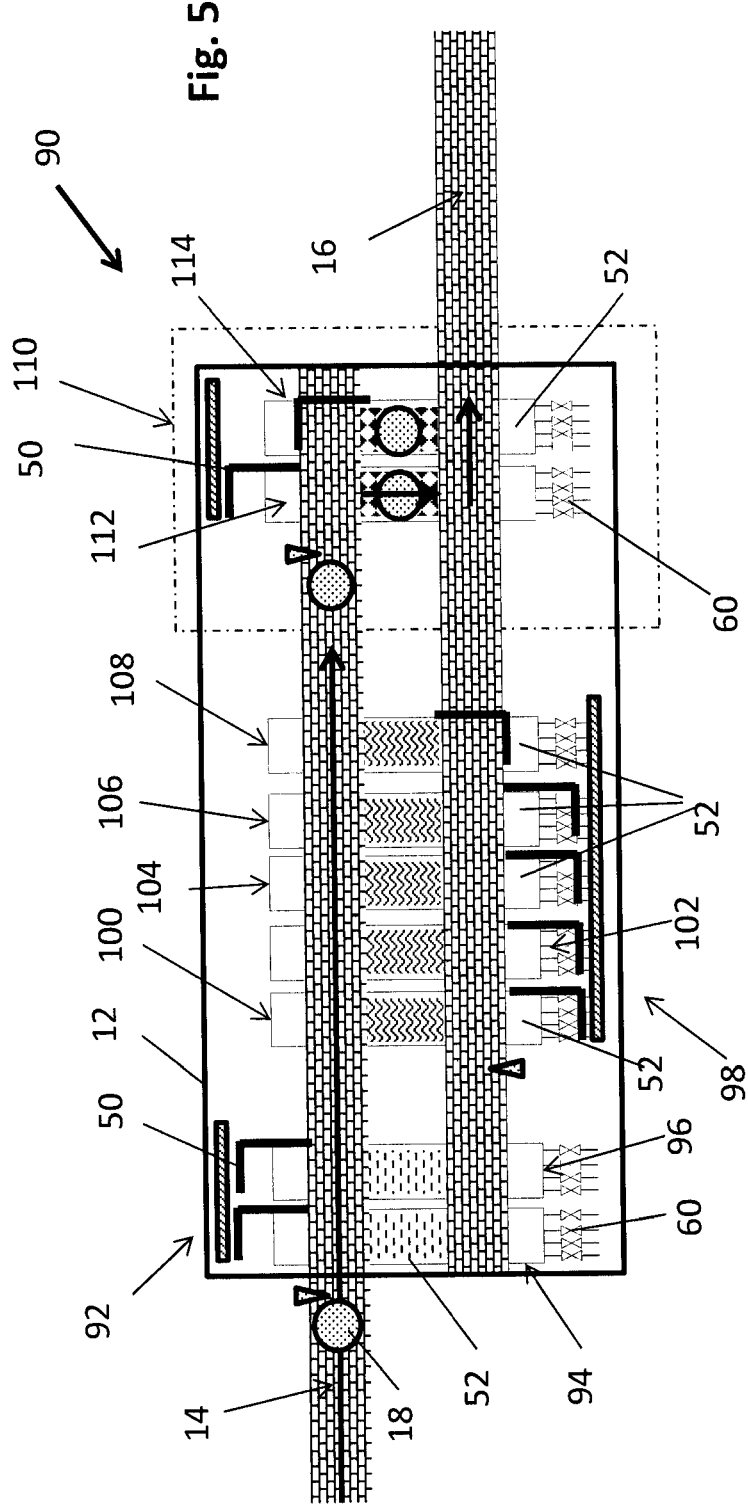
FIG. 5 shows a schematic representation of a larger container-treatment machine for treating returnable kegs and non-returnable kegs.

FIG. 5 shows a fourth embodiment of a container-treatment machine 90 that contains a pre-cleaning group 92 with two pre-cleaning modules 94, 96, a cleaning group 98 with five cleaning modules 100-108, and a filling group 110 with two filling modules 112, 114. The container-treatment machine 90 processes returnable kegs. These kegs run through the pre-cleaning group 92 and the cleaning group 98. The container-treatment machine 90 is also suitable for filling non-returnable kegs. These kegs run via the first transport device 14 straight to the filling group 110, which then uses the two filling modules 112, 114 to simultaneously fill pairs of containers in the two filling modules. Once filled, these containers are transferred to second transport device 16.

The fourth embodiment of a container-treatment machine 90 can also be adapted to process new or non-returnable containers, which need no cleaning. These new containers are guided past all intermediate conveyors 52 and/or cleaning groups 92, 98 and are passed directly to the treatment modules of the filling group 110. Alternatively, the containers 18 could also be guided and treated in a kind of cleaning operation coming from first transport device 14 by way of the pre-cleaning group 92. Once rinsed in this way, containers 18 would then be returned via a deactivated cleaning group 98, i.e. without containers 18 being treated with a fluid, back to the first transport device 14 and from there to the filling group 110 or to the filling modules.

Figure 6:
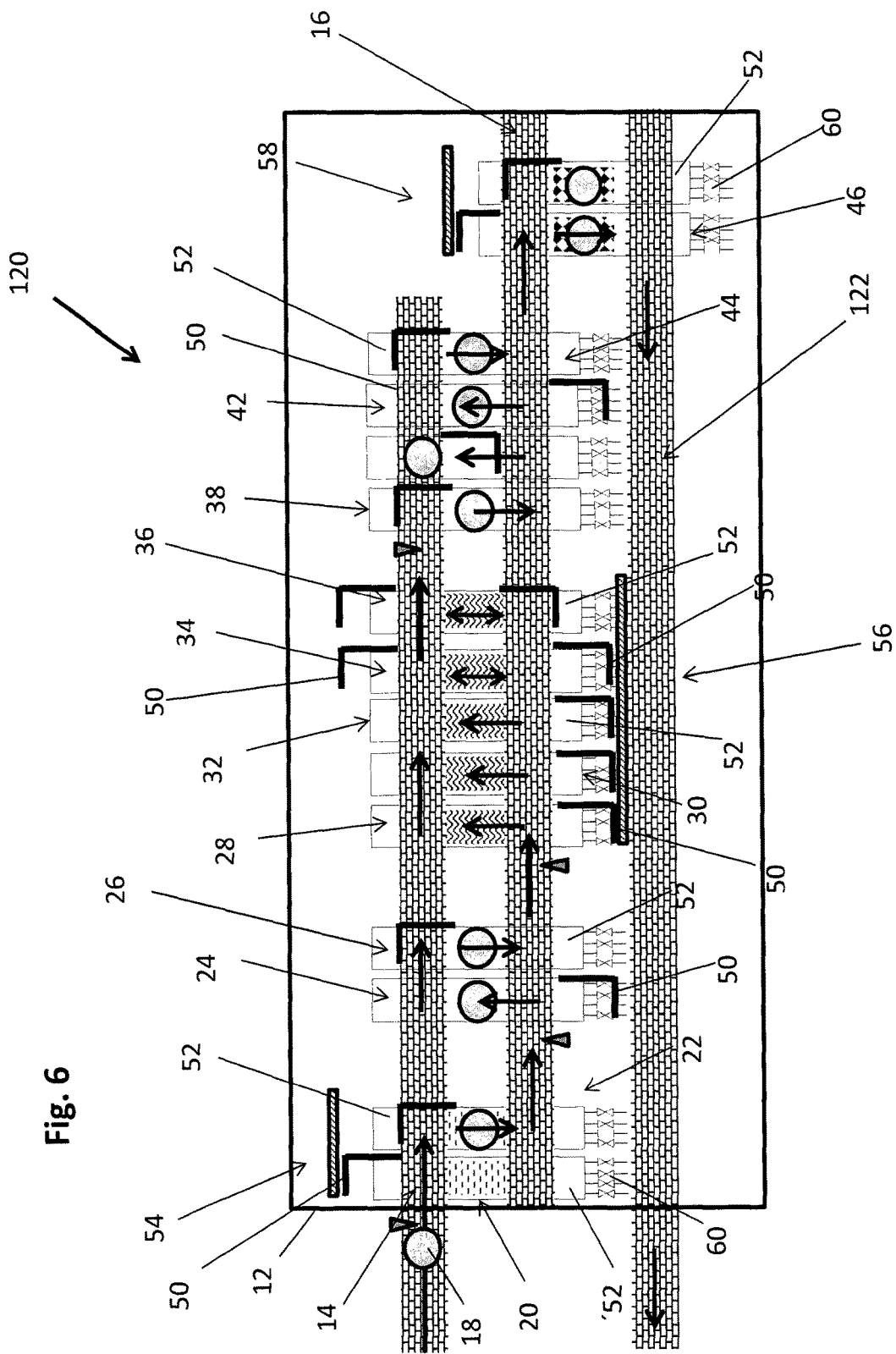
FIG. 6 shows a container-treatment machine that has three transport devices parallel to one another.

FIG. 6 shows a container-treatment machine 120 that has three transport devices 14, 16 and 122 arranged parallel to one another. In this embodiment, the pre-cleaning group 54, the transfer conveyor 24, 26, the main cleaning group 56 as well as the buffer stations 38 to 42 and the inspection and test station 44 all extend between the first and second transport devices 14, 16. The first and second transport device 14, 16 convey in identical directions. The third transport device 122 conveys in a conveying direction that is contrary to that of the first and second transport devices. The filling group 58, with its two filling stations 46, 48, is arranged between the second and third transport devices 116, 122. The third transport device 122 forms the container discharge.

It will be apparent that the above mentioned treatment modules do not necessarily have to be modular in configuration. They can, instead, be permanently installed in the frame 12 of container-treatment machine 10, 70, 80, 90. Alternatively, some may be modular and others may be permanently installed.

In the figures, the same reference numbers indicate parts that are identical or that have the same functions. The depicted embodiments should not limit the extent of protection of this application, but the invention can be varied within the scope of the claims.

The invention claimed is:

1. An apparatus comprising a container-treatment machine for treating kegs that have valve closures that are pressed by a ram during treatment of said keg, said apparatus comprising parallel first and second transport devices for transporting said kegs, a filling station and a cleaning station arranged between said first and second transport devices and being configured to use a ram to press a valve closure of a keg, and first and second intermediate conveyors that convey said kegs to said filling and cleaning stations respectively and that extend between said first and second transport devices, wherein said intermediate conveyors convey said kegs in contrary directions.

2. The apparatus of claim 1, wherein said container-treatment device is configured to operate said first and second transport paths and at least one of said intermediate conveyors to define a serpentine path along which a container meanders through said container-treatment machine.

3. The apparatus of claim 1, wherein said cleaning station comprises a a main cleaning module at which kegs arrive after having passed through a pre-cleaning module.

4. The apparatus of claim 1, wherein said cleaning station comprises a pre-cleaning module at which kegs arrive before proceeding to a main cleaning module.

5. The apparatus of claim 1, wherein said cleaning station comprises an external cleaning station that cleans the outside of a keg.

6. The apparatus of claim 1, wherein comprises further comprising a buffer module for station for holding and pausing kegs when throughputs of said filling and cleaning stations do not match.

7. The apparatus of claim 1, wherein said cleaning station comprises a sterilization station.

8. The apparatus of claim 1, further comprising an inspection-and-test station that is configured to receive said kegs after said kegs have been processed by said cleaning station.

9. The apparatus of claim 1, further comprising an inspection-and-test station that controls feeding of kegs to said cleaning station.

10. The apparatus of claim 1, further comprising a third transport device, wherein said third transport device is arranged in parallel adjacent to said first transport device, wherein said third transport device conveys in a direction contrary to that of said first transport device, wherein said third transport device is connected to said intermediate conveyor.

11. The apparatus of claim 8, further comprising a third transport device, wherein said third transport device is arranged in parallel adjacent to said first transport device, wherein said third transport device conveys in a direction contrary to that of said first transport device, and wherein said inspection-and-test station connects to said third transport device.

12. The apparatus of claim 8, further comprising a third transport device, wherein said third transport device is arranged in parallel adjacent to said first transport device, wherein said third transport device conveys in a direction contrary to that of said first transport device, and wherein said inspection-and-test station controls said third transport device.

13. The apparatus of claim 1, further comprising a third transport device and a container discharge station, wherein said third transport device is arranged in parallel adjacent to said first transport device, wherein said third transport device conveys in a direction contrary to that of said first transport device, and wherein said third transport device connects to said container discharge station.

14. The apparatus of claim 1, further comprising switchable deflection-elements that are arranged in a connection region between said first and second transport devices and said intermediate conveyors.

15. The apparatus of claim 14, wherein said deflection elements are mounted on said intermediate conveyors.

16. The apparatus of claim 1, wherein said intermediate conveyors are configured to have reversible conveyor directions.

17. The apparatus of claim 1, wherein said first and second transport devices comprise elliptically displaceable lifting beams.

18. The apparatus of claim 1, further comprising stop elements arranged in conjunction with said intermediate conveyors.

19. The apparatus of claim 1, further comprising guide elements that are arranged in conjunction with said intermediate conveyors.

20. The apparatus of claim 1, further comprising a transfer conveyor with no associated cleaning station or filling station arranged between said transport devices, wherein said transfer conveyor transfers kegs from one transport device to another.

21. The apparatus of claim 1, further comprising a third transport device, wherein said third transport device is arranged in parallel adjacent to said first transport device, wherein said third transport device conveys in a direction contrary to that of said first transport device, and wherein said third transport device is connected a separate transfer conveyor.

22. The apparatus of claim 1, further comprising a frame that removably holds said cleaning station and said filling station, said cleaning station and said filling station being detachable from said frame.

23. The apparatus of claim 1, further comprising a frame that holds said intermediate conveyors, said intermediate conveyors being detachable from said frame.

24. The apparatus of claim 1, wherein said first conveying device conveys in a first direction and wherein said second conveying device conveys in said first direction.

25. The apparatus of claim 1, wherein said first and second transport devices comprise endless conveyor-belts.

26. A method comprising
using a container-treatment machine for treating kegs in a container-treatment machine that have valve closures that are pressed by a ram during treatment of said keg, said container-treatment machine having
parallel first and second transport devices for transporting said kegs,
treatment stations that include a filling station and at least one cleaning station arranged between said first and second transport devices and being configured to use a ram to press a valve closure of a keg, said treatment stations being arranged between parallel first and second transport devices, wherein at least one of said treatment stations is configured to use a ram to press a valve closure of a keg, and
first and second intermediate conveyors that convey said kegs to said filling and cleaning stations respectively, wherein said conveyors extend between said first and second transport devices, and wherein said intermediate conveyors convey said kegs in contrary directions,
said method further comprising passing kegs through different treatment stations based on a condition of said kegs.

27. The apparatus of claim 1, wherein said container-treatment machine comprises a fluid interface that couples automatically to fluid interfaces on said cleaning station and on said filling station when said cleaning station and said filling station are pushed into a frame.

28. The apparatus of claim 1, wherein said container-treatment device accommodates a plurality of treatment modules that can be latched or pushed into a frame between said first and second transport devices.

29. The apparatus of claim 1, said container-treatment device accommodates a plurality of treatment modules that can brought together as a combined module to form treatment groups.

30. The apparatus of claim 1, said container-treatment device accommodates a plurality of treatment modules, one of which comprises a transfer module at which a keg waits while fluid introduced by another treatment module is given time to act.

* * * * *